(12) United States Patent
Lv

(10) Patent No.: US 11,378,849 B2
(45) Date of Patent: Jul. 5, 2022

(54) ARRAY SUBSTRATE AND DISPLAY PANEL

(71) Applicant: SHENZHEN CHINA STAR OPTOELECTRONICS SEMICONDUCTOR DISPLAY TECHNOLOGY CO., LTD., Shenzhen (CN)

(72) Inventor: Xiaowen Lv, Shenzhen (CN)

(*) Notice: Subject to any disclaimer, the term of this patent is extended or adjusted under 35 U.S.C. 154(b) by 323 days.

(21) Appl. No.: 16/626,544

(22) PCT Filed: Dec. 19, 2019

(86) PCT No.: PCT/CN2019/126476
§ 371 (c)(1),
(2) Date: Dec. 25, 2019

(87) PCT Pub. No.: WO2021/114342
PCT Pub. Date: Jun. 17, 2021

(65) Prior Publication Data
US 2021/0364869 A1 Nov. 25, 2021

(30) Foreign Application Priority Data
Dec. 9, 2019 (CN) .......................... 201911249088.X

(51) Int. Cl.
G02F 1/1362 (2006.01)
G02F 1/1343 (2006.01)

(52) U.S. Cl.
CPC .. *G02F 1/134363* (2013.01); *G02F 1/134318* (2021.01); *G02F 1/136213* (2013.01); *G02F 1/136286* (2013.01)

(58) Field of Classification Search
CPC ......... G02F 1/134363; G02F 1/134318; G02F 1/136213; G02F 1/136286; G02F 1/134309
See application file for complete search history.

(56) References Cited

U.S. PATENT DOCUMENTS

| 2013/0083263 | A1 | 4/2013 | Kim et al. |
| 2016/0195788 | A1 | 7/2016 | Bae et al. |
| 2016/0320672 | A1* | 11/2016 | Hong ................. G02F 1/13394 |
| 2017/0038655 | A1* | 2/2017 | Cheng .............. G02F 1/133514 |
| 2020/0058679 | A1 | 2/2020 | Lee et al. |

FOREIGN PATENT DOCUMENTS

| CN | 105759518 A | 7/2016 |
| CN | 106707596 A | 5/2017 |
| CN | 109064909 A | 12/2018 |
| CN | 109634015 A | 4/2019 |
| WO | WO-2020087663 A1 * | 5/2020 ....... G02F 1/136213 |

* cited by examiner

*Primary Examiner* — Donald L Raleigh

(57) ABSTRACT

An array substrate and a display panel are provided. The array substrate includes a base substrate and a plurality of pixel units distributed in an array on the base substrate. The pixel unit includes a common electrode and a pixel electrode positioned above the common electrode. Meanwhile, the pixel electrode includes a main electrode and a branch electrode electrically connected to the main electrode, and an orthographic projection of the common electrode on the base substrate coincides with at least a part of an orthographic projection of the main electrode on the base substrate.

18 Claims, 7 Drawing Sheets

ARRAY SUBSTRATE AND DISPLAY PANEL

FIELD OF INVENTION

The present application relates to the field of display technologies, and in particular, to an array substrate and a display panel.

BACKGROUND OF INVENTION

A liquid crystal display panel generally includes an array substrate, a color filter substrate, and a liquid crystal layer positioned between the array substrate and the color filter substrate. In the array substrate, a common electrode is generally provided below the pixel electrode. A storage capacitor formed by the pixel electrode and the common electrode is used to reduce the voltage variations caused by electric leakage and increase the potential retention capability. In order to increase the capacitance of the storage capacitor, a method of increasing an area of the common electrode is generally adopted.

However, storage capacitors are generally made of metal sandwiched with an insulating layer, the common electrode is opaque, and an increase in the area of the common electrode will cause a decrease in the aperture ratio.

SUMMARY OF INVENTION

Technical Problem

The present application provides an array substrate to solve the technical problem that a common electrode is opaque, and an increase in an area of the common electrode will cause a decrease in the aperture ratio.

Technical Solutions

In a first aspect, the present application provides an array substrate. The array substrate includes a base substrate and a plurality of pixel units distributed in an array on the base substrate, wherein each of the pixel units includes:
  a common electrode; and
  a pixel electrode positioned above the common electrode;
  wherein the pixel electrode includes a main electrode and a branch electrode electrically connected to the main electrode, and an orthographic projection of the common electrode on the base substrate coincides with at least a part of an orthographic projection of the main electrode on the base substrate.

In some embodiments, the common electrode includes a first common electrode line, and the first common electrode line is disposed corresponding to the main electrode.

In some embodiments, a shape and a size of the first common electrode line are same as a shape and a size of the main electrode.

In some embodiments, the orthographic projection of the common electrode on the base substrate does not coincide with an orthographic projection of the branch electrode on the base substrate.

In some embodiments, each of the pixel units includes a main region and a sub region, and the pixel electrode includes a first pixel electrode positioned in the main region and a second pixel electrode positioned in the sub region, and
  wherein the second pixel electrode includes a second main electrode and a second branch electrode, the orthographic projection of the common electrode on the base substrate coincides with at least a part of an orthographic projection of the second main electrode on the base substrate.

In some embodiments, the second main electrode includes a first split and a second split crossing each other, the first split is arranged along a lateral direction, the second split is arranged along a longitudinal direction, the second branch electrode is arranged obliquely, and an edge line of the second branch electrode forms included angles with edge lines of the first split and the second split.

In some embodiments, the orthographic projection of the common electrode on the base substrate coincides with at least a part of an orthographic projection of the first split on the base substrate.

In some embodiments, the array substrate further including
  a first metal layer disposed on the base substrate, and
  a second metal layer positioned between the first metal layer and the pixel electrode;
  wherein the common electrode is disposed in a same layer as the first metal layer.

In some embodiments, the first metal layer includes scan lines arranged in a lateral direction, one of the scan lines is arranged corresponding to one row of the pixel units; the second metal layer includes data lines arranged in a longitudinal direction, one of the data lines is arranged corresponding to one column of pixel units; and the common electrode further includes a second common electrode line arranged close to the data lines and parallel to the data lines.

According to a second aspect, the present application further provides a display panel, the display panel including a color filter substrate and an array substrate, and a liquid crystal layer disposed between the color filter substrate and the array substrate; wherein the array substrate includes a base substrate and a plurality of pixel units are distributed in an array on the base substrate, wherein each of the pixel units includes:
  a common electrode; and
  a pixel electrode positioned above the common electrode;
  wherein the pixel electrode includes a main electrode and a branch electrode electrically connected to the main electrode, and an orthographic projection of the common electrode on the base substrate coincides with at least a part of an orthographic projection of the main electrode on the base substrate.

In some embodiments, the common electrode includes a first common electrode line, and the first common electrode line is disposed corresponding to the main electrode.

In some embodiments, a shape and a size of the first common electrode line are same as a shape and a size of the main electrode.

In some embodiments, the orthographic projection of the common electrode on the base substrate does not coincide with an orthographic projection of the branch electrode on the base substrate.

In some embodiments, each of the pixel units includes a main region and a sub region, and the pixel electrode includes a first pixel electrode positioned in the main region and a second pixel electrode positioned in the sub region, and
  wherein the second pixel electrode includes a second main electrode and a second branch electrode, the orthographic projection of the common electrode on the base substrate coincides with at least a part of an orthographic projection of the second main electrode on the base substrate.

In some embodiments, the second main electrode includes a first split and a second split crossing each other, the first split is arranged along a lateral direction, the second split is arranged along a longitudinal direction, the second branch electrode is arranged obliquely, and an edge line of the second branch electrode forms included angles with edge lines of the first split and the second split.

In some embodiments, the orthographic projection of the common electrode on the base substrate coincides with at least a part of an orthographic projection of the first split on the base substrate.

In some embodiments, the display panel further including a first metal layer disposed on the base substrate, and
a second metal layer positioned between the first metal layer and the pixel electrode;
wherein the common electrode is disposed in a same layer as the first metal layer.

In some embodiments, the first metal layer includes scan lines arranged in a lateral direction, one of the scan lines is arranged corresponding to one row of the pixel units; the second metal layer includes data lines arranged in a longitudinal direction, one of the data lines is arranged corresponding to one column of pixel units; and the common electrode further includes a second common electrode line arranged close to the data lines and parallel to the data lines.

Beneficial Effect

By arranging a part of the common electrode corresponding to the main electrode and forming a storage capacitor by using the main electrode and the common electrode, the capacitance of the storage capacitor is increased without affecting the aperture ratio of the array substrate, thereby reducing the voltage variations caused by electric leakage and increasing potential retention capability.

Figure 1:
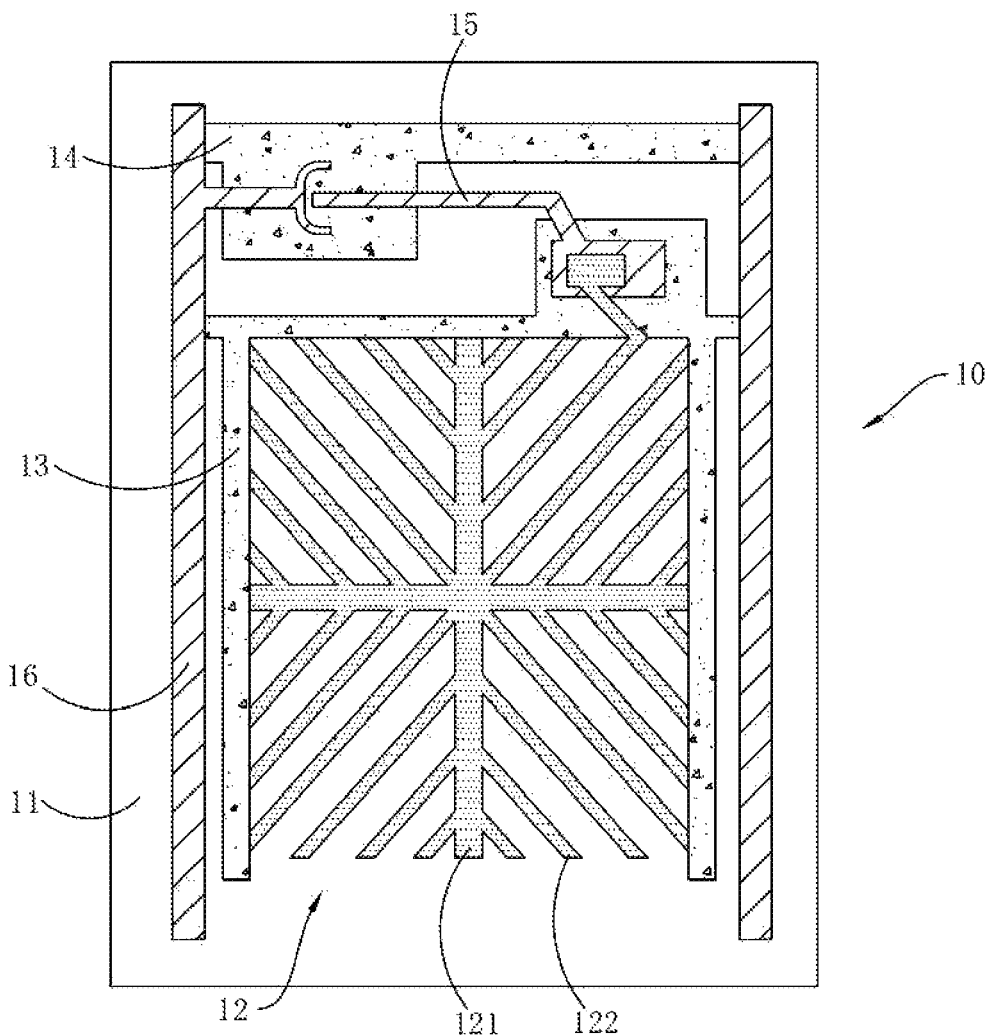
FIG. 1 is a schematic diagram of a first structure of an array substrate in a first embodiment of the present application.

REFERENCE NUMERALS 10, array substrate; 11, base substrate; 12, pixel electrode; 121, main electrode; 122, branch electrode; 123, first main electrode; 124, first branch electrode; 125, second main electrode; 1251, first split; 1252, second split; 126, second branch electrode; 13, common electrode; 131, first common electrode line; 132, second common electrode line; 133, first common electrode; 134, second common electrode; 14, scan line; 15, source-drain electrode; 16, data line; 17, high-potential power line; 18, main region; 19, sub region; 20, color filter substrate; and 30, liquid crystal layer.

DETAILED DESCRIPTION OF EMBODIMENTS

The present application provides an array substrate and a display panel. In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, and are not used to limit the application.

The present application is directed to the conventional array substrate. Generally, storage capacitors are generally made of metal sandwiched with an insulating layer, and an increase in an area of a common electrode will cause a technical problem that the aperture ratio decreases. The present application can solve the above-mentioned problems.

Figure 2:
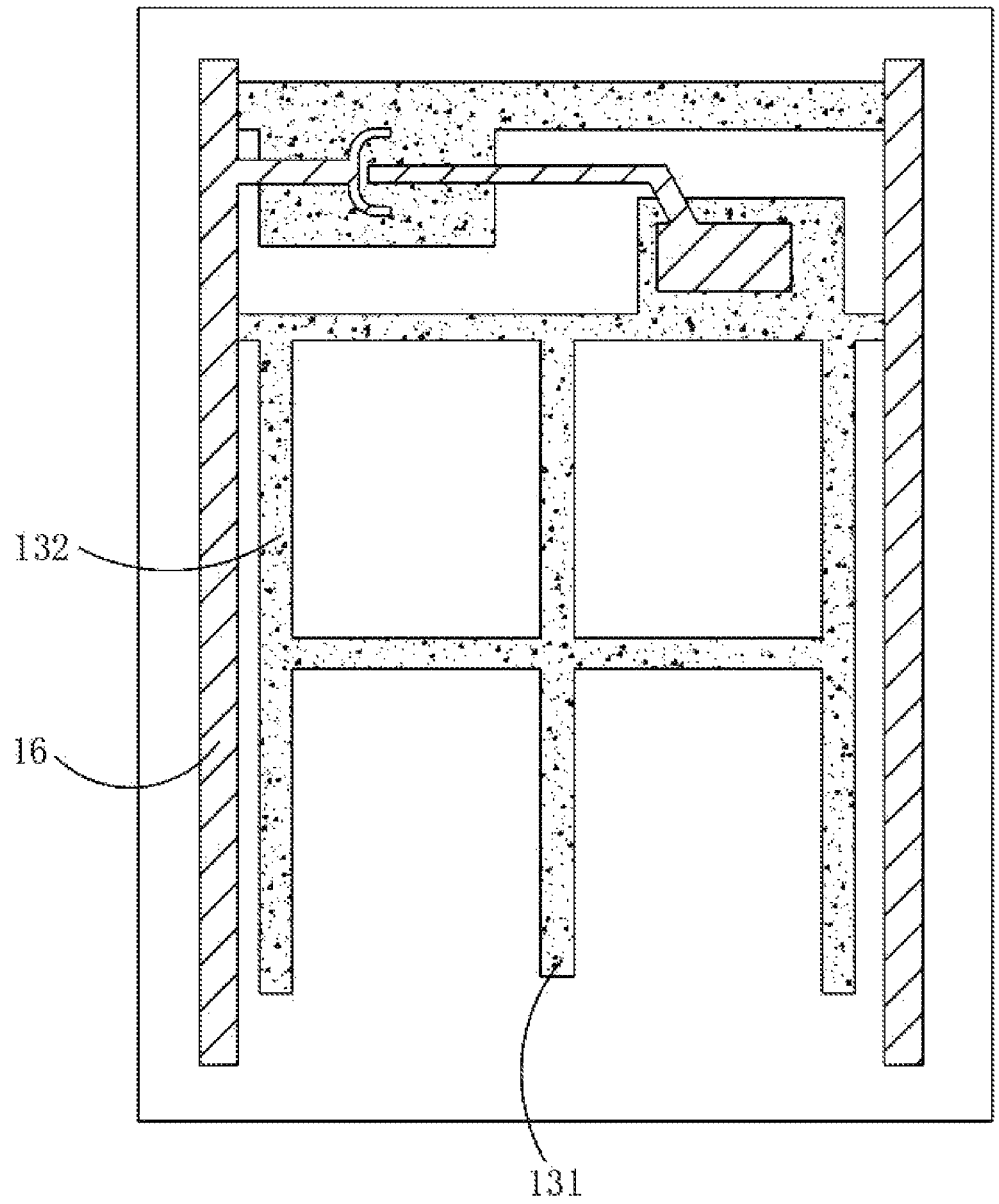
FIG. 2 is a schematic diagram of removing the pixel electrode from FIG. 1.

An array substrate, as shown in FIG. 1 and FIG. 2, where the array substrate 10 includes a base substrate 11 and a plurality of pixel units distributed in an array on the base substrate 11.

The pixel unit includes a common electrode 13 and a pixel electrode 12 positioned above the common electrode 13. The pixel electrode 12 includes a main electrode 121 and a branch electrode 122 electrically connected to the main electrode 121.

In a first embodiment, the array substrate 10 is a four-domain region array substrate 10, as shown in FIG. 1 to FIG. 2, that is, the main electrode 121 divides a sub-pixel region into four domain regions.

Specifically, an orthographic projection of the common electrode 13 on the base substrate 11 coincides with at least a part of an orthographic projection of the main electrode 121 on the base substrate 11.

It should be noted that, for those skilled in the art, a region in which the main electrode 121 is disposed on the array substrate 10 is a dark region where the liquid crystal is disordered, and the aperture ratio is not contributed here.

By arranging a part of the common electrode 13 corresponding to the main electrode 121 and forming a storage capacitor by using the main electrode 121 and the common electrode 13, the capacitance of the storage capacitor is increased without affecting the aperture ratio of the array substrate 10, thereby reducing the voltage variations caused by electric leakage and increasing potential retention capability.

In an embodiment, the common electrode 13 includes a first common electrode line 131, and the first common electrode line 131 is disposed corresponding to the main electrode 121.

Furthermore, a shape and a size of the first common electrode line 131 are same as a shape and a size of the main electrode 121. Therefore, the first common electrode line 131 and the main electrode 121 are used to form a storage capacitor, meanwhile, the first common electrode line 131 is prevented from reducing the aperture ratio of the array substrate 10.

Furthermore, an overall shape of the main electrode 121 is in a cross shape, the first common electrode line 131 is in a cross shape and matched with the main electrode 121. The branch electrode 122 is arranged obliquely, and an edge line of the branch electrode 122 forms an included angle with an edge line of the main electrode 121.

Figure 3:
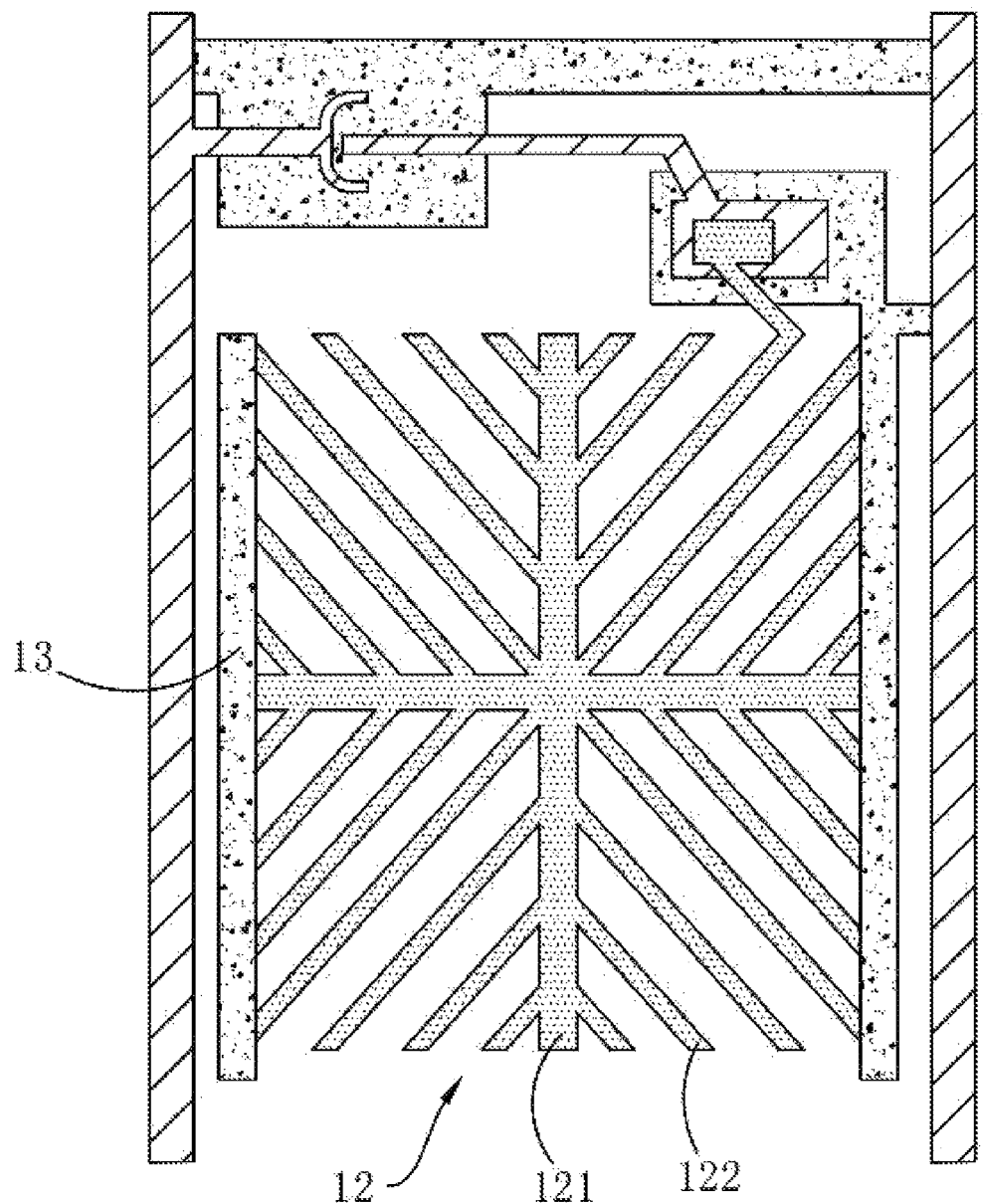
FIG. 3 is a schematic diagram of a second structure of the array substrate in the first embodiment of the present application.

As shown in FIG. 3, in an embodiment, where the orthographic projection of the common electrode 13 on the base substrate 11 does not coincide with an orthographic projection of the branch electrode 122 on the base substrate 11.

When the main electrode 121 and the common electrode 13 are used to form a storage capacitor and the capacitance of the storage capacitor is ensured, an overlapping portion of the common electrode 13 and the branch electrode 122 is removed, thereby further improving the aperture ratio of the array substrate 10.

Specifically, the array substrate 10 further includes a first metal layer disposed on the base substrate 11 and a second metal layer positioned between the first metal layer and the pixel electrode 12.

Specifically, the first metal layer includes a plurality of scan lines 14 arranged along a lateral direction and spaced apart from each other, and each scan line 14 is disposed corresponding to a row of the pixel units to provide scan signals for the pixel units.

The common electrode 13 is disposed in a same layer as the first metal layer, and the common electrode 13 and the first metal layer can be formed by same material and same process, or can be formed by different materials and processes.

Specifically, the second metal layer includes source-drain electrodes 15 and a plurality of data lines 16 arranged along a longitudinal direction and spaced apart from each other. One of the data lines 16 is arranged corresponding to one column of the pixel units. The data lines 16 and the source-drain electrodes 15 are electrically connected to provide data signals to the source-drain electrodes 15, and the pixel electrode 12 is electrically connected to the source-drain electrodes 15 to receive the data signals.

Specifically, the common electrode 13 further includes a second common electrode line 132 arranged close to the data lines 16 and parallel to the data lines 16.

The setting of the second common electrode line 132 can be used to shield voltage variations caused by the coupling capacitance formed between the data line 16 and the pixel electrode 12, thereby reducing risks such as crosstalk.

Figure 4:
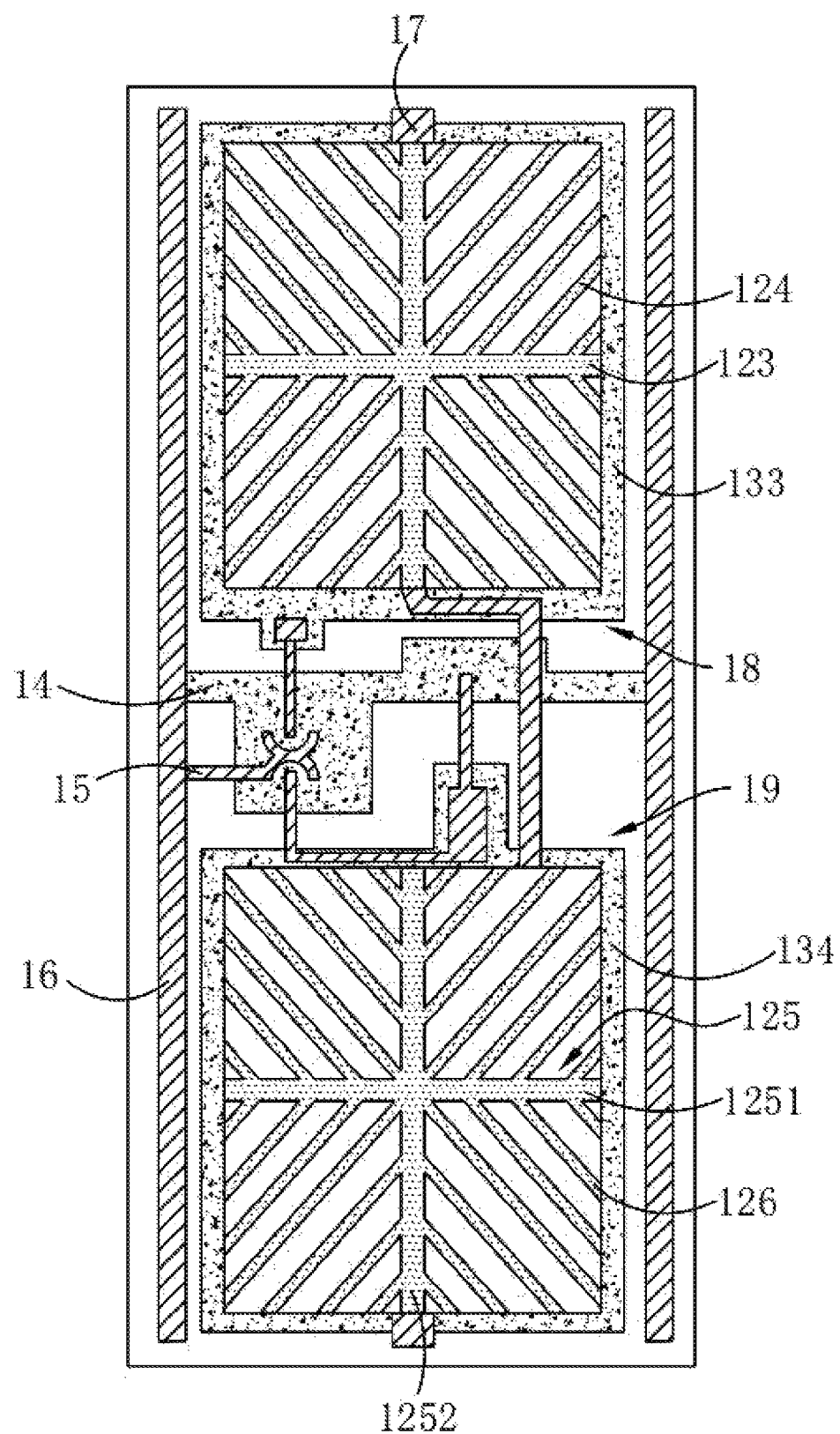
FIG. 4 is a schematic diagram of a first structure of an array substrate in a second embodiment of the present application.
Figure 5:
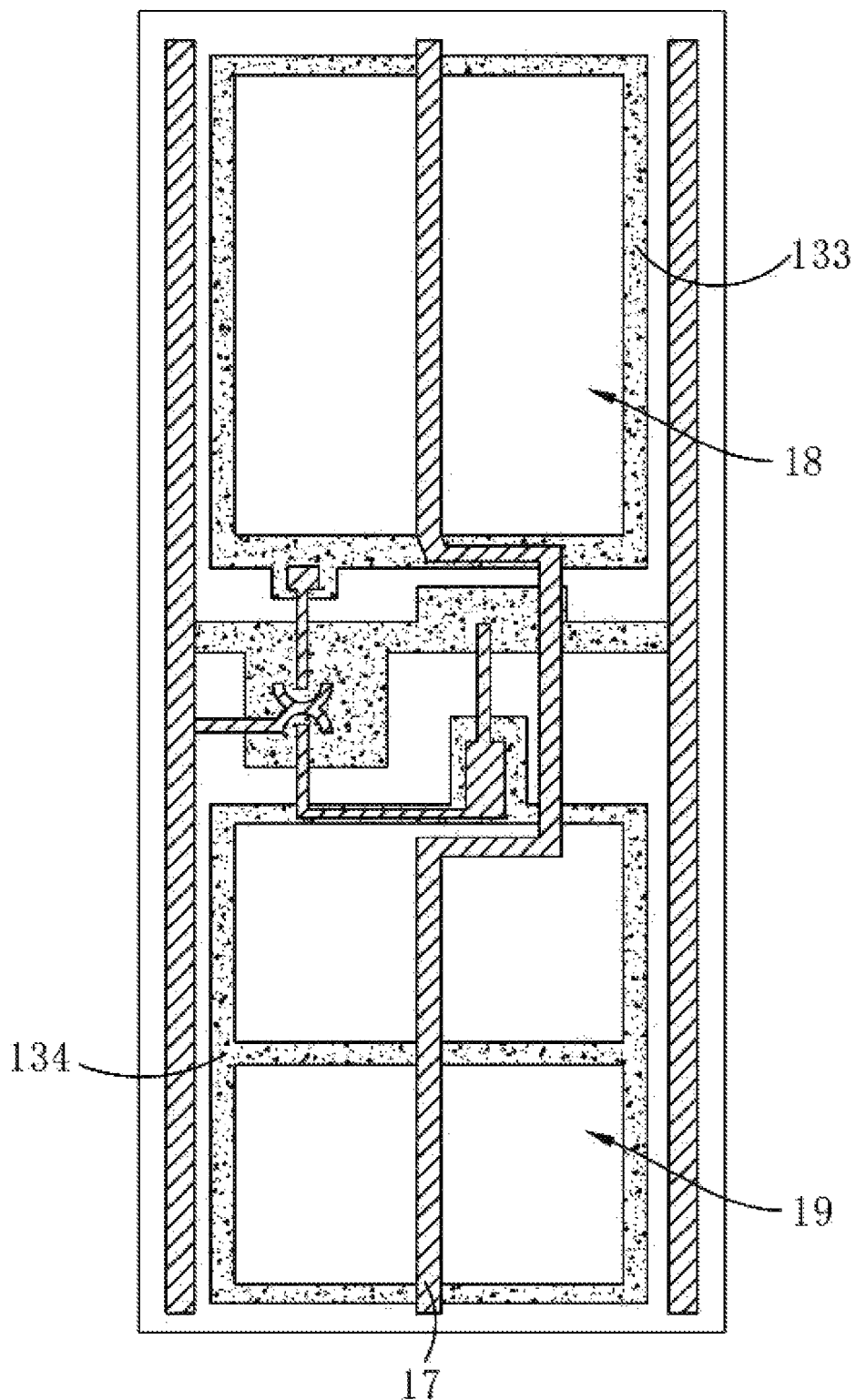
FIG. 5 is a schematic diagram of removing the pixel electrode from FIG. 4.

In a second embodiment, as shown in FIG. 4 and FIG. 5, where the array substrate 10 is an eight-domain region array substrate 10.

Specifically, each of the pixel units includes a main region 18 and a sub region 19, and the pixel electrode 12 includes a first pixel electrode in the main region 18 and a second pixel electrode in the sub region 19.

The first pixel electrode includes a first main electrode 123 and a first branch electrode 124, and the second pixel electrode includes a second main electrode 125 and a second branch electrode 126. The first main electrode 123 divides the main region 18 into four domain regions, and the second main electrode 125 divides the sub region 19 into four domain regions.

It should be noted that sizes of the first pixel electrode and the second pixel electrode are inconsistent, resulting in different driving voltage differences between the main region 18 and the sub region 19, and a certain voltage difference is set by utilization of a spatial domain region to increase the diversity of liquid crystal molecules, which can improve the characteristic of wide viewing angle color shift.

In an embodiment, the first main electrode 123 and the second main electrode 125 are both in a cross shape.

Specifically, the orthographic projection of the common electrode 13 on the base substrate 11 coincides with at least a part of an orthographic projection of the second main electrode 125 on the base substrate 11.

As known to those skilled in the art, the parasitic capacitance of the sub region 19 is larger, so the sub region 19 also needs a storage capacitor with a larger capacitance. By setting a portion of the common electrode 13 to correspond to the second main electrode 125, the capacitance of the storage capacitor in the sub region 19 is increased on the premise that the aperture ratio of the sub region 19 is not affected.

Specifically, the second main electrode 125 includes a first split 1251 and a second split 1252 which are disposed crossing each other, the first split 1251 is arranged along the lateral direction, and the second split 1252 is arranged along the longitudinal direction.

The second branch electrode 126 is arranged obliquely, and an edge line of the second branch electrode 126 forms included angles with edge lines of the first split 1251 and the second split 1252.

Specifically, the second metal layer further includes a high-potential power line 17. An orthographic projection of the high-potential power line 17 on the base substrate 11 coincides with at least a part of an orthographic projection of the second split 1252 on the base substrate 11.

Furthermore, the orthographic projection of the common electrode 13 on the base substrate 11 coincides with at least a part of an orthographic projection of the first split 1251 on the base substrate 11.

Specifically, the common electrode 13 includes a first common electrode 133 positioned in the main region 18 and a second common electrode 134 positioned in the sub region 19. An orthographic projection of second common electrode 134 on the base substrate 11 coincides with at least a part of an orthographic projection of the second main electrode 125 on the base substrate 11.

It should be noted that FIG. 5 merely illustrates the case where the first split 1251 completely coincides with the common electrode 13. In actual implementation, as shown in FIG. 6, it can also be to set a part of the first part 1251 to coincide with the common electrode 13, that is, the orthographic projection of the common electrode 13 on the base substrate 11 merely coincides with a part of the orthographic projection of the first split 1251 on the base substrate 11.

Figure 6:
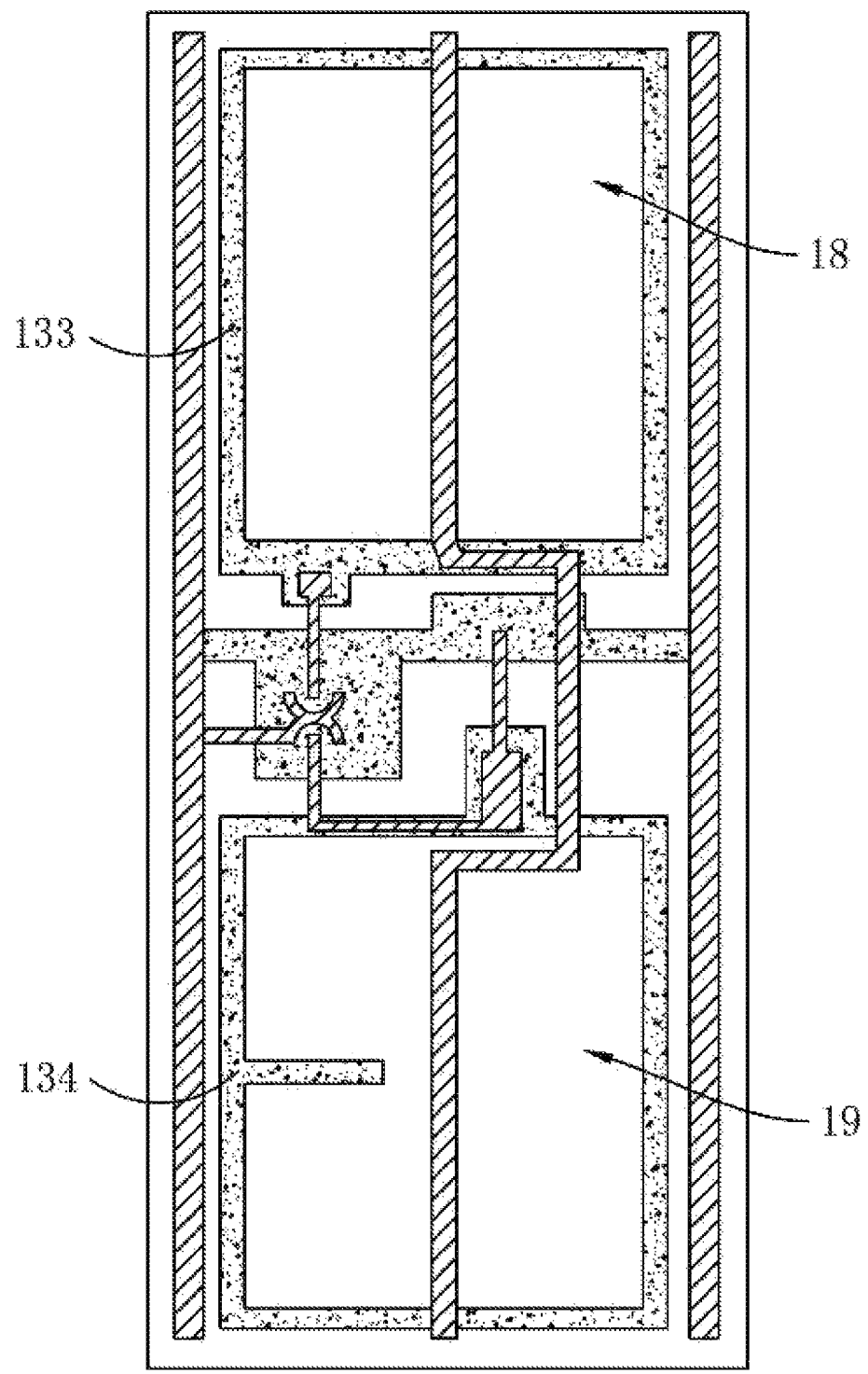
FIG. 6 is a schematic diagram of a second structure of the array substrate in the second embodiment of the present application.

It should be noted that FIG. 5 and FIG. 6 merely show the case where only the second pixel electrode 12 coincides with the common electrode 13. In actual implementation, it can also be to set a part of the common electrode 13 to coincide with the first pixel electrode 12.

Figure 7:
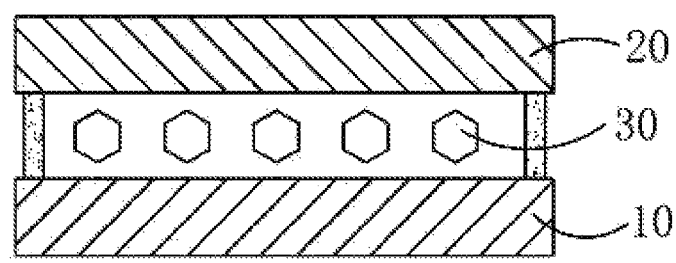
FIG. 7 is a schematic structural diagram of a display panel in the present application.

Based on the above-mentioned array substrate, the present application also provides a display panel. As shown in FIG. 7, where the display panel includes a color filter substrate 20 and the array substrate 10 according to any one of the above-mentioned embodiments, and a liquid crystal layer 30 disposed between the color filter substrate 20 and the array substrate 10.

The beneficial effect of the present application is: by arranging a part of the common electrode 13 corresponding to the main electrode 121 and forming a storage capacitor by using the main electrode 121 and the common electrode 13, the capacitance of the storage capacitor is increased without affecting the aperture ratio of the array substrate 10, thereby reducing the voltage variations caused by electric leakage and increasing potential retention capability.

In the above-mentioned embodiments, the description of each embodiment has its own emphasis. For a part that is not described in detail in an embodiment, reference may be made to related descriptions in other embodiments.

Embodiments of the present invention have been described, but not intended to impose any unduly constraint to the appended claims. For a person skilled in the art, any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. An array substrate, comprising a base substrate and a plurality of pixel units distributed in an array on the base substrate, wherein each of the pixel units comprises:
    a common electrode; and
    a pixel electrode positioned above the common electrode;
        wherein the pixel electrode comprises a cross-shaped main electrode and a branch electrode electrically connected to the cross-shaped main electrode, and an orthographic projection of the common electrode on the base substrate coincides with at least a part of an orthographic projection of the cross-shaped main electrode on the base substrate; and
        wherein the common electrode extends toward a center of the cross-shaped main electrode.

2. The array substrate according to claim 1, wherein the common electrode comprises a first common electrode line, and the first common electrode line is disposed. corresponding to the cross-shaped main electrode.

3. The array substrate according to claim 2, wherein a shape and a size of the first common electrode line are same as a shape and a size of the cross-shaped main electrode.

4. The array substrate according to claim 1, wherein the orthographic projection of the common electrode on the base substrate does not coincide with an orthographic projection of the branch electrode on the base substrate.

5. The array substrate according to claim 1, wherein each of the pixel units comprises a main region and a sub region, and the pixel electrode comprises a first pixel electrode positioned in the main region and a second pixel electrode positioned in the sub region, and
    wherein the second pixel electrode comprises a second cross-shaped marry electrode and a second branch electrode, the orthographic projection of the common electrode on the base substrate coincides with at least a part of an orthographic projection of the second cross-shaped main electrode on the base substrate.

6. The array substrate according to claim 1, wherein the second cross-shaped main electrode comprises a first split and a second split crossing each other, the first split is arranged along a lateral direction, the second split is arranged along a longitudinal direction, the second branch electrode is arranged obliquely, and an edge line of the second branch electrode forms included angles with edge lines of the first split and the second split.

7. The array substrate according to claim 6, wherein the orthographic projection of the common electrode on the base substrate coincides with at least a part of an orthographic projection of the first split on the base substrate.

8. The array substrate according to claim 2, further comprising
    a first metal layer disposed on the base substrate, and
    a second metal layer positioned between the first metal layer and the pixel electrode;
    wherein the common electrode is disposed in a same layer as the first metal layer.

9. The array substrate according to claim 8, wherein the first metal layer comprises scan lines arranged in a lateral direction, one of the scan lines is arranged corresponding to one row of the pixel units; the second metal layer comprises data lines arranged in a longitudinal direction, one of the data lines is arranged corresponding to one column of pixel units; and the common electrode further comprises a second common electrode line arranged close to the data lines and parallel to the data lines.

10. A display panel, comprising a color filter substrate and an array substrate, and a liquid crystal layer disposed between the color filter substrate and the array substrate; wherein the array substrate comprises a base substrate and a plurality of pixel units are distributed in an array on the base substrate, wherein each of the pixel units comprises:
    a common electrode; and
    a pixel electrode positioned above the common electrode;
        wherein the pixel electrode comprises a cross-shaped main electrode and a branch electrode electrically connected to the cross-shaped main electrode, and an orthographic projection of the common electrode on the base substrate coincides with at least a part of an orthographic projection of the cross-shaped main electrode on the base substrate; and
        wherein the common electrode extends toward a center of the cross-shaped main electrode.

11. The display panel according to claim 10, wherein the common electrode comprises a first common electrode line, and the first common electrode line is disposed corresponding to the cross-shaped main electrode.

12. The display panel according to laim 11, wherein a shape and a size of the first common electrode line are same as a shape and a size of the cross-shaped main electrode.

13. The display panel according to claim 10, wherein the orthographic projection of the common electrode on the base substrate does not coincide with an orthographic projection of the branch electrode on the base substrate.

14. The display panel according to claim 10, wherein each of the pixel units comprises a main region and a sub region, and the pixel electrode comprises a first pixel electrode positioned in the main region and a second pixel electrode positioned in the sub region, and
    wherein the second pixel electrode comprises a second cross-shaped main electrode and a second branch electrode, the orthographic projection of the common electrode on the base substrate coincides with at least a part of an orthographic projection of the second cross-shaped main electrode on the base substrate.

15. The display panel according to claim 14, wherein the second cross-shaped main electrode comprises a first split and a second split crossing each other, the first split is arranged along a lateral direction, the second split is arranged along a longitudinal direction, the second branch electrode is arranged obliquely, and an edge line of the second branch electrode forms included angles with edge lines of the first split and the second split.

16. The display panel according to claim 15, wherein the orthographic projection of the common electrode on the base substrate coincides with at least a part of an orthographic projection of the first split on the base substrate.

17. The display panel according to claim 11, further comprising
    a first metal layer disposed on the base substrate, and
    a second metal layer positioned between the first metal layer and the pixel electrode;
    wherein the common electrode is disposed in a same layer as the first metal layer.

18. The display panel according to claim 17, wherein the first metal layer comprises scan lines arranged in a lateral direction, one of the scan lines is arranged corresponding to one row of the pixel units; the second metal layer comprises data lines arranged in a longitudinal direction, one of the data lines is arranged corresponding to one column of pixel units; and the common electrode further comprises a second common electrode line arranged close to the data lines and parallel to the data lines.

\* \* \* \* \*